United States Patent
Yamaguchi

(10) Patent No.: US 10,674,314 B2
(45) Date of Patent: Jun. 2, 2020

(54) MOBILE TERMINAL POSITION DETECTION DEVICE AND MOBILE TERMINAL POSITION DETECTION METHOD

(71) Applicant: DENSO CORPORATION, Kariya, Aichi-pref. (JP)

(72) Inventor: Taichi Yamaguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/559,422

(22) Filed: Sep. 3, 2019

(65) Prior Publication Data

US 2019/0394616 A1 Dec. 26, 2019

Related U.S. Application Data

(63) Continuation of application No. PCT/JP2018/008208, filed on Mar. 5, 2018.

(30) Foreign Application Priority Data

Apr. 13, 2017 (JP) ................................. 2017-080082

(51) Int. Cl.
*H04W 4/02* (2018.01)
*H04B 7/08* (2006.01)
*H04W 4/40* (2018.01)
*H04W 64/00* (2009.01)

(52) U.S. Cl.
CPC .......... *H04W 4/025* (2013.01); *H04B 7/0857* (2013.01); *H04W 4/40* (2018.02); *H04W 64/003* (2013.01)

(58) Field of Classification Search
CPC ..... H04W 4/025; H04W 64/003; H04W 4/40; H04B 7/0857
See application file for complete search history.

(56) References Cited

U.S. PATENT DOCUMENTS

| | | | |
|---|---|---|---|
| 9,688,247 B1 | 6/2017 | Jayaraman et al. |
| 9,794,753 B1 | 10/2017 | Stitt et al. |
| 9,894,492 B1 | 2/2018 | Elangovan et al. |
| 10,002,479 B2 | 6/2018 | Oz et al. |
| 10,244,476 B2 | 3/2019 | Elangovan et al. |
| 10,328,898 B2 | 6/2019 | Golsch et al. |
| 10,328,899 B2 | 6/2019 | Golsch |

(Continued)

FOREIGN PATENT DOCUMENTS

| | | |
|---|---|---|
| BR | 102014017465 A2 | 2/2016 |
| CN | 104574593 A | 4/2015 |

(Continued)

*Primary Examiner* — Joseph E Dean, Jr.
(74) *Attorney, Agent, or Firm* — Harness, Dickey & Pierce, P.L.C.

(57) ABSTRACT

A mobile terminal position detection device detects an existence position of a mobile terminal by acquiring a signal strength of a radio wave from the mobile terminal received by each of a plurality of receivers. The mobile terminal position detection device requests one receiver to connect to the mobile terminal; acquire connection information; output the connection information to an unconnected receiver; acquire the signal strength of the radio wave from the mobile terminal; and detect the existence position of the mobile terminal based on the signal strength.

4 Claims, 9 Drawing Sheets

(56) References Cited

U.S. PATENT DOCUMENTS

| | | |
|---|---|---|
| 10,328,900 B1 | 6/2019 | Yakovenko et al. |
| 2004/0189522 A1 | 9/2004 | Watanabe et al. |
| 2006/0019678 A1 | 1/2006 | Itoh et al. |
| 2011/0215921 A1 | 9/2011 | Ben Ayed et al. |
| 2012/0045058 A1 | 2/2012 | Weghaus |
| 2013/0103200 A1* | 4/2013 | Tucker ............... G01C 21/206 700/275 |
| 2014/0274013 A1 | 9/2014 | Santavicca |
| 2015/0148989 A1 | 5/2015 | Cooper et al. |
| 2015/0161832 A1 | 6/2015 | Esselink et al. |
| 2015/0310681 A1 | 10/2015 | Avery et al. |
| 2015/0356797 A1 | 12/2015 | McBride et al. |
| 2016/0150407 A1 | 5/2016 | Michaud et al. |
| 2017/0062938 A1 | 3/2017 | Cheng et al. |
| 2017/0104589 A1 | 4/2017 | Lambert et al. |
| 2017/0132533 A1 | 5/2017 | Darnell et al. |
| 2017/0309098 A1 | 10/2017 | Watters et al. |
| 2017/0330402 A1 | 11/2017 | Menard et al. |
| 2018/0029560 A1 | 2/2018 | Mohaupt et al. |
| 2018/0099643 A1 | 4/2018 | Golsch et al. |
| 2018/0103414 A1 | 4/2018 | Golsch |
| 2018/0126952 A1 | 5/2018 | Niemiec |
| 2018/0154865 A1 | 6/2018 | Bianchi, III et al. |
| 2018/0269565 A1 | 9/2018 | Guthrie et al. |

FOREIGN PATENT DOCUMENTS

| | | |
|---|---|---|
| JP | 2003248045 A | 9/2003 |
| JP | 2004289586 A | 10/2004 |
| JP | 2006020005 A | 1/2006 |
| JP | 2009177588 A | 8/2009 |
| JP | 2015145578 A | 8/2015 |
| WO | 16156682 A1 | 10/2016 |
| WO | 2017181050 A1 | 10/2017 |
| WO | 18040641 A1 | 3/2018 |

\* cited by examiner (a)

(b)

MOBILE TERMINAL POSITION DETECTION DEVICE AND MOBILE TERMINAL POSITION DETECTION METHOD

CROSS REFERENCE TO RELATED APPLICATION

The present application is a continuation application of International Patent Application No. PCT/JP2018/008208 filed on Mar. 5, 2018, which designated the U.S. and claims the benefit of priority from Japanese Patent Application No. 2017-80082 filed on Apr. 13, 2017. The entire disclosures of all of the above applications are incorporated herein by reference.

TECHNICAL FIELD

The present disclosure relates to a mobile terminal position detection device and a mobile terminal position detection method for detecting an existence position of a mobile terminal by receiving a radio wave from a mobile terminal with the use of multiple receivers mounted on a vehicle.

BACKGROUND

If a position of an occupant can be detected around a vehicle or in a vehicle interior, it is considered that various services can be provided to the occupant. Therefore, today, a technique for detecting a position of a mobile terminal (therefore, the position of an occupant) by installing small receivers at multiple places of a vehicle and receiving radio waves from the mobile terminal has been proposed focusing on the fact that a large number of occupants carry a mobile terminal capable of performing a wireless communication.

SUMMARY

A mobile terminal position detection device detects an existence position of a mobile terminal by acquiring a signal strength of a radio wave from the mobile terminal received by each of a plurality of receivers. The mobile terminal position detection device requests one receiver to connect to the mobile terminal; acquire connection information; output the connection information to an unconnected receiver; acquire the signal strength of the radio wave from the mobile terminal; and detect the existence position of the mobile terminal based on the signal strength.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
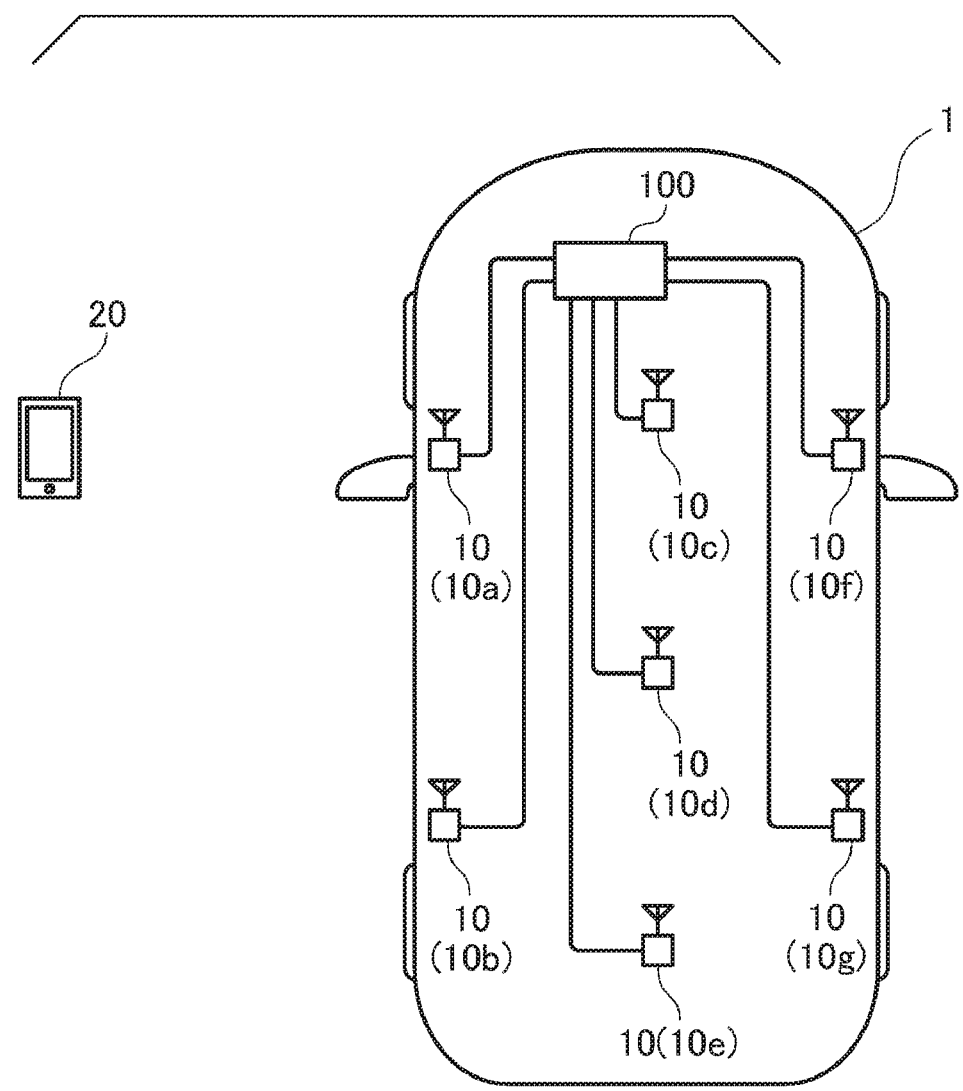
FIG. 1 is an illustrative diagram showing a rough structure of a vehicle equipped with a mobile terminal position detection device according to the present embodiment.

In a technique, a distance from each receiver to the mobile terminal is estimated based on a signal strength of radio waves in the receivers installed at multiple places, thereby detecting a position where the mobile terminal exists (therefore, the position of the occupant).

However, since a signal strength of the radio waves transmitted from the mobile terminal changes depending on the surrounding environment of the mobile terminal or the receiver, a large error is included in the distance estimated based on the reception strength. As a result, an error is also included in the position of the mobile terminal obtained based on those distances. Therefore, in order to improve the detection accuracy of the position of the mobile terminal, the number of places where the receivers are installed is increased, and the position of the mobile terminal is detected with the use of a larger number of distances from the receivers to the mobile terminal.

However, in the technique described above, the accuracy of the detection position of the mobile terminal is not necessarily improved when the number of places where the receivers are installed is increased, which results in such a problem that it is difficult to secure a sufficient positional accuracy. The reasons are as follows:

First, in order for the receiver to receive radio waves from the mobile terminal, there is no need to establish a communication connection between the receiver and the mobile terminal. Therefore, as the number of receivers increases, a time required since a first receiver establishes a connection and receives the radio waves until a last receiver establishes a connection and receives the radio waves becomes longer. Since the position of the mobile terminal can be moved even during that time, an error in position accuracy occurs according to the amount of movement. Naturally, if the number of receivers is increased, the time required since the first receiver receives the radio waves until the last receiver receives the radio waves becomes longer, so that the error caused by the movement of the mobile terminal during that time becomes larger. In the case of a vehicle, there is no need to determine whether the mobile terminal is present in the vehicle interior or in the vehicle exterior, and when a positional accuracy for that determination is to be ensured, the error caused by increasing the number of receivers becomes non-negligibly large. For that reason, the conventional technique has a problem that it is difficult to detect the position of the mobile terminal with sufficient accuracy.

In an example embodiment, a mobile terminal position detection device and a mobile terminal position detection method for accurately detecting a location of a mobile terminal by receiving radio waves from a mobile terminal are provided.

According to an example embodiment, a mobile terminal position detection device configured to detect an existence position of a mobile terminal by acquiring a signal strength of a radio wave from the mobile terminal received by each of a plurality of receivers which are mounted on a vehicle and connected to the mobile terminal position detection device, the mobile terminal position detection device includes: a connection request unit that requests at least one of the plurality of receivers to connect to the mobile terminal; a connection information acquisition unit that acquires connection information, used for a connected receiver to connect with the mobile terminal, from the connected receiver when the connected receiver connected to the mobile terminal among the plurality of receivers is established; a connection information output unit that outputs the connection information acquired from the connected receiver to an unconnected receiver that has not yet been connected to the mobile terminal, and switches the unconnected receiver into a state ready for receiving the radio wave from the mobile terminal; a signal strength acquisition unit that acquires the signal strength of the radio wave from the mobile terminal, which is received by each of the connected receiver and the unconnected receiver; and an existence position detection unit that detects the existence position of the mobile terminal based on the signal strength acquired from each of the connected receiver and the unconnected receiver.

In the mobile terminal position detection device described above, since the multiple receivers can detect the signal strength of the same radio waves transmitted by the mobile terminal, even if the number of receivers for receiving the radio waves is increased, there is no risk that an error will occur due to the movement of the mobile terminal while the receivers receive the radio wave. This makes it possible to detect the existence position of the mobile terminal with sufficient accuracy.

According to an example embodiment, a mobile terminal position detection method of detecting an existence position of a mobile terminal by acquiring a signal strength of a radio wave from the mobile terminal received by each of a plurality of receivers which are mounted on a vehicle, the method includes: requesting at least one of the plurality of receivers to connect to the mobile terminal; acquiring connection information, used for a connected receiver to connect with the mobile terminal, from the connected receiver when the connected receiver connected to the mobile terminal among the plurality of receivers is established; outputting the connection information acquired from the connected receiver to an unconnected receiver that has not yet been connected to the mobile terminal, and switching the unconnected receiver into a state ready for receiving the radio wave from the mobile terminal; acquiring the signal strength of the radio wave from the mobile terminal, which is received by each of the connected receiver and the unconnected receiver; and detecting the existence position of the mobile terminal based on the signal strength acquired from each of the connected receiver and the unconnected receiver.

In the mobile terminal position detection method described above, since the multiple receivers can detect the signal strength of the same radio waves transmitted by the mobile terminal, even if the number of receivers for receiving the radio waves is increased, there is no fear that an error will occur due to the movement of the mobile terminal while the receivers receive the radio wave. This makes it possible to detect the existence position of the mobile terminal with sufficient accuracy.

A. Device Configuration:

FIG. 1 shows a rough structure of a vehicle 1 on which a mobile terminal position detection device 100 is mounted according to the present embodiment. As shown in the figure, the vehicle 1 is equipped with receivers 10 at seven locations. In the present embodiment, it is assumed that the number of receivers 10 mounted on the vehicle 1 is seven, but the number of receivers 10 is not limited to seven, and for example, more receivers 10 may be mounted. When there is a need to distinguish those receivers 10 from each other, those receivers 10 are referred to as a receiver 10a, a receiver 10b, a receiver 10c, a receiver 10d, a receiver 10e, a receiver 10f, and a receiver 10g, but when there is no need to distinguish those receivers from each other, those receivers are simply referred to as receivers 10 or receivers 10a to 10g.

Those receivers 10a to 10g are each provided with an antenna for transmitting and receiving radio waves and a control unit connected to the antenna for controlling transmission and reception of the radio waves, and the control unit of each of the receivers 10a to 10g is connected to a mobile terminal position detection device 100. For that reason, the mobile terminal position detection device 100 can receive the radio waves from the mobile terminal 20 existing outside or inside the vehicle 1, and can transmit the radio waves toward the mobile terminal 20, with the use of the receivers 10a to 10g. If the mobile terminal position detection device 100 detects the signal strength when the receivers 10a to 10g receive the radio waves from the mobile terminal 20, the mobile terminal position detection device 100 can determine the existence position of the mobile terminal 20.

However, the signal strength of the radio waves changes due to an influence of the surrounding environment of the receivers 10 and the mobile terminal 20. For that reason, a large error may be included in the existence position of the mobile terminal 20 determined based on the signal strength, which makes it difficult to ensure positional accuracy to the extent distinguishable whether the mobile terminal 20 is present in the interior of the vehicle 1 or in the exterior of the vehicle 1.

Further, if the number of receivers 10 is increased and the number of detected signal strengths is increased, a decrease in the positional accuracy due to a variation in signal strength can be reduced. On the other hand, an error caused by an increase in the number of receivers 10 becomes large.

For that reason, as shown in FIG. 1, in the method of detecting the signal strength of the radio waves by the multiple receivers 10, it is difficult to secure sufficient positional accuracy in the method of detecting the existence position of the mobile terminal 20 based on the signal strength of the radio waves.

However, in the mobile terminal position detection device 100 according to the present embodiment, the number of receivers 10 is increased, thereby being capable of improving the detection accuracy of the existence position of the mobile terminal 20 as much as possible (at least in principle). Nevertheless, the process is not complicated at all. Hereinafter, the mobile terminal position detection device 100 of the present embodiment having such excellent characteristics will be described, and a conventional method will be outlined as a preparation for the present embodiment.

Figure 2:
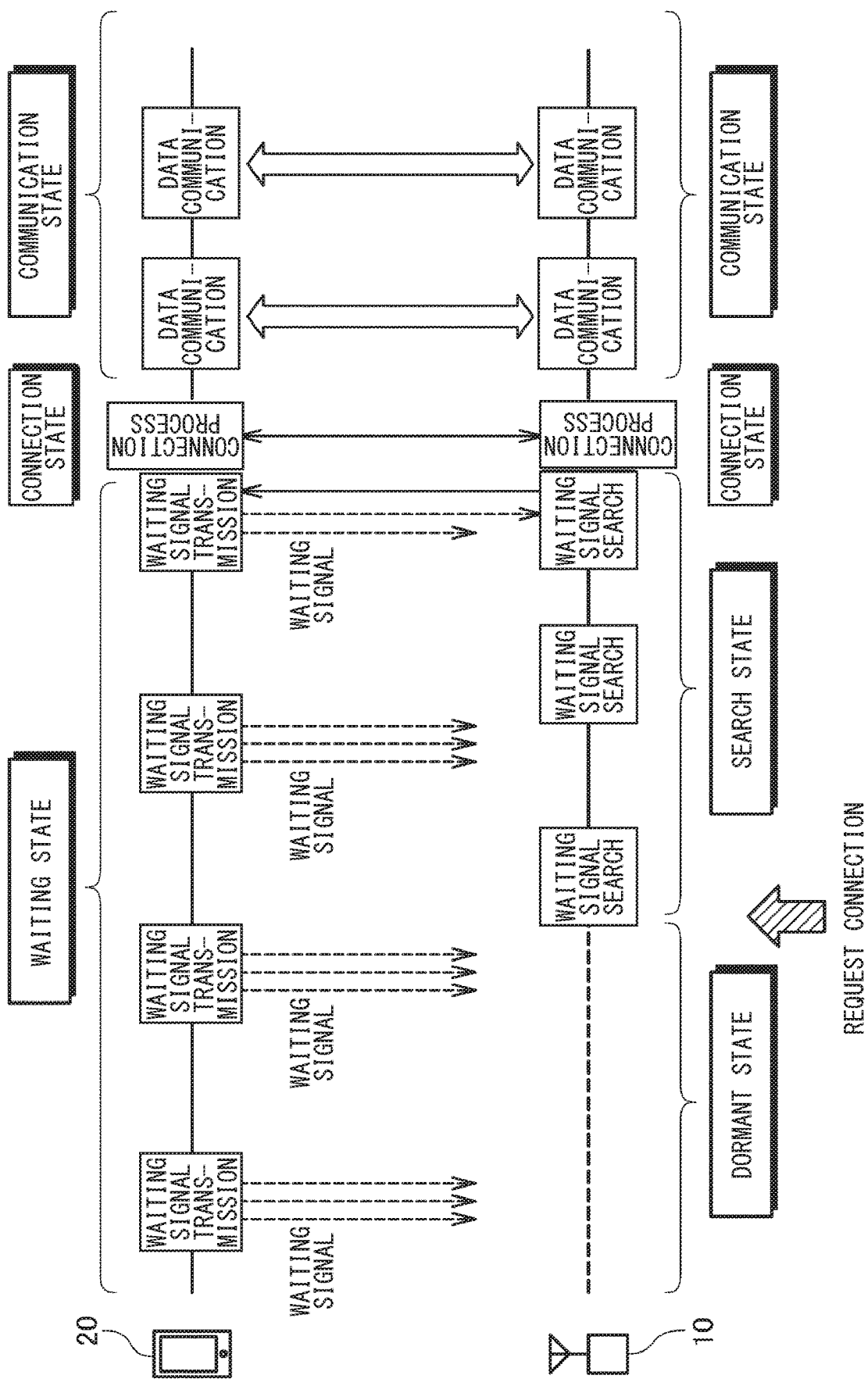
FIG. 2 is an illustrative diagram showing a procedure in which a receiver connects to a mobile terminal and starts wireless communication.

FIG. 2 illustrates a state in which the receiver 10 establishes a connection with the mobile terminal 20 in order to receive the radio waves from the mobile terminal 20. In FIG. 2, as an example, a case of a communication standard in which a wireless communication is performed with the use of the radio waves in a frequency band of 2.4 GHz will be described, but other communication standards may be used.

The communication standard illustrated in FIG. 2 employs a so-called master-client system, and the receivers 10 on a master side are in a dormant state for the purpose of reducing a power consumption while communication is not performed.

The mobile terminal 20 on a client side transmits a waiting signal indicating that the mobile terminal 20 is waiting for connection in a predetermined cycle. The waiting signal includes, in addition to waiting for connection from the master side, information relating to the mobile terminal 20 itself, a function that can be provided to a device (in this example, the receiver 10) on the master side and the like. Accordingly, the receiver 10 on the master side can recognize the presence of the mobile terminal 20 by receiving the waiting signal and determine whether or not to connect to the mobile terminal 20.

However, even if the waiting signal is transmitted while the receiver 10 is in a dormant state, the signal is not received by the receiver 10. Therefore, even if the mobile terminal 20 continuously transmits the waiting signal, the signal is wasted. The same applies to the case where the receiver 10 does not exist or the case where the receiver 10 determines that the connection is not made as a result of the reception of the waiting signal. Therefore, in a communication standard illustrated in FIG. 2, for the purpose of reducing a power consumption on the client side (in this example, the mobile terminal 20), the waiting signal is not transmitted continuously, but is transmitted every time a predetermined time elapses.

An elapsed time from the transmission of the waiting signal to the transmission again can be selected within a range of several tens of milliseconds to several seconds. The waiting signal is sometimes called an advertisement signal depending on the communication standard.

As described above with reference to FIG. 1, the receiver 10 is connected to the mobile terminal position detection device 100, and when a request for connecting to the mobile terminal 20 is received from the mobile terminal position detection device 100, the receiver 10 is switched from the dormant state to a search state, and starts searching for the waiting signal.

As shown in FIG. 2, in the search for the waiting signal, the waiting signal from the mobile terminal 20 is searched for a predetermined time, but when the waiting signal is not found, the search is temporarily interrupted, and the search for the waiting signal is started again after a predetermined time has elapsed. The reason why the search is performed every time a predetermined time elapses, rather than continuously searching until the waiting signal is found, is to reduce the power consumption of the receiver 10. That is, if the waiting signal cannot be received or if the waiting signal is not a waiting signal from the mobile terminal 20 even if the waiting signal has been received, it is considered that the state is likely to continue for a while, and therefore, even if the waiting signal is continuously received, an electric power is wastefully consumed. Therefore, once reception is interrupted to avoid the power consumption, and when a predetermined time has elapsed, the search for the waiting signal is started again.

As described above, since the mobile terminal 20 also intermittently transmits the waiting signal (that is, every time a predetermined time interval elapses), a period in which the receiver 10 searches for the waiting signal and a period in which the mobile terminal 20 transmits the waiting signal may be different from each other. However, a cycle in which the mobile terminal 20 transmits the waiting signal and a cycle in which the receiver 10 searches for the waiting signal are set to be different from each other. For that reason, the period in which the mobile terminal 20 transmits the waiting signal overlaps with the period in which the receiver 10 searches for the waiting signal, and the receiver 10 can receive the waiting signal of the mobile terminal 20.

When the receiver 10 receives the waiting signal from the mobile terminal 20, and determines to connect to the mobile terminal 20, the receiver 10 transmits a connection request signal requesting the connection. Then, the mobile terminal 20 which has received the connection request signal recognizes that the receiver 10 has been connected, terminates the waiting state, and shifts to a connection state, and starts a connection process for establishing the connection with the receiver 10. After transmitting the connection request signal, the receiver 10 also terminates the search state and shifts to the connection state, and starts a connection process for establishing a connection with the mobile terminal 20.

In this way, when the mobile terminal 20 and the receiver 10 shift to the connection state, the connection is established by exchanging various information necessary for wireless communication, such as identification numbers of each other, a frequency channel used for wireless communication, a communication interval, and data structure of the data to be communicated, and the like.

When the connection is established, both the mobile terminal 20 and the receiver 10 shift to the communication state and start a data communication. When the data communication is completed, the mobile terminal 20 returns to the waiting state, the receiver 10 returns to the dormant state, and a series of processing described above is resumed.

As described above, the receiver 10 and the mobile terminal 20 adopt a so-called master-client communication standard, so that the mobile terminal 20 on the client side has three states of "waiting state", "connection state" and "communication state", and the receiver 10 on the master side has four states of "dormant state", "search state", "connection state" and "communication state". The mobile terminal 20 on the client side and the receiver 10 on the master side communicate with each other by switching those states so as to keep pace with each other.

However, as a result of adopting the communication system described above, when the signal strength of the radio waves from the mobile terminal 20 is going to be detected by the multiple receivers 10, a time required for the detection increases as the number of receivers 10 increases.

Figure 3:
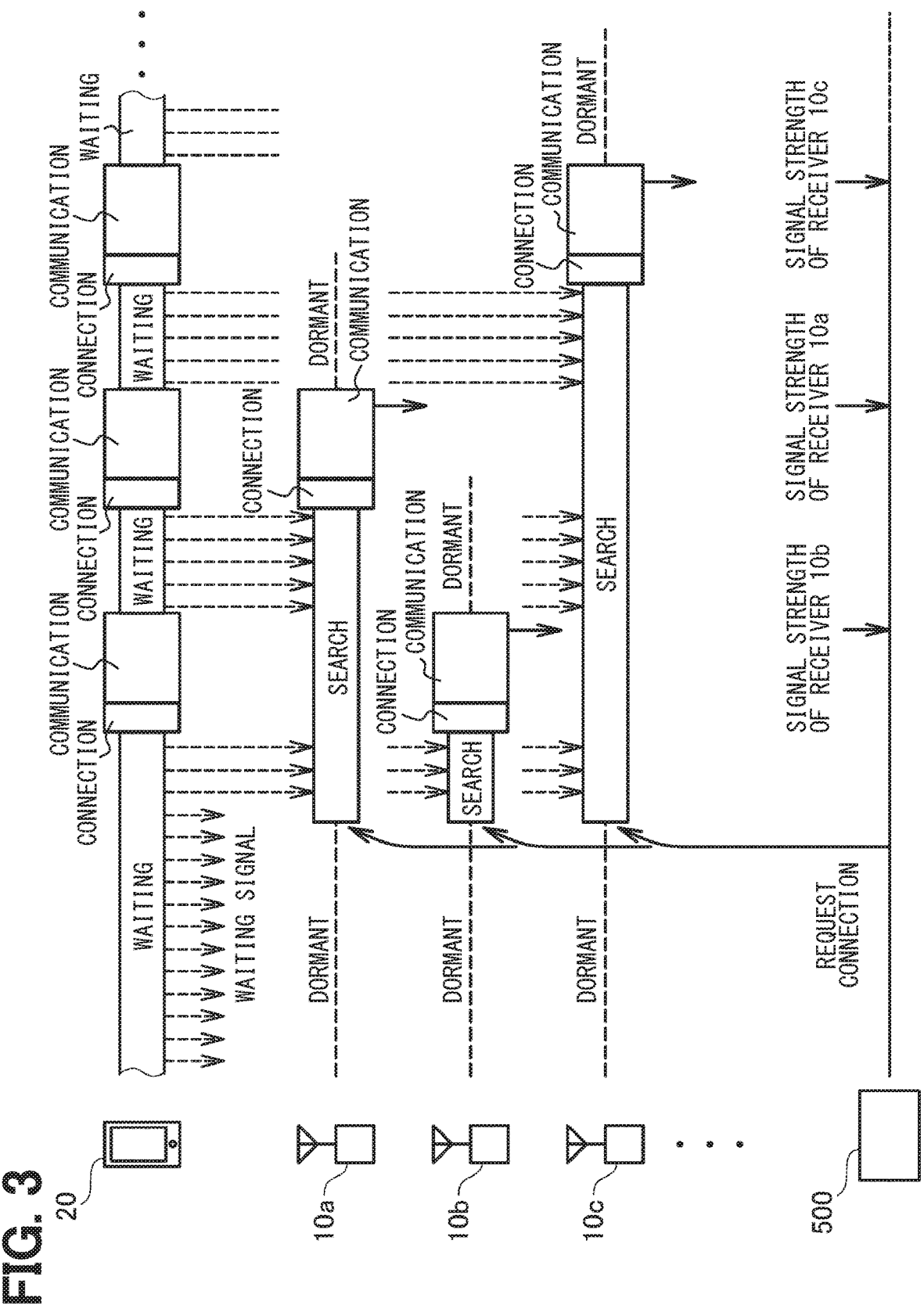
FIG. 3 is an illustrative diagram showing a reason why a conventional connection method requires a longer time to detect a signal strength of radio waves from the mobile terminal as the number of receivers increases.

FIG. 3 illustrates a state in which a conventional mobile terminal position detection device 500 detects the signal strength of the radio waves from the mobile terminal 20 in the receivers 10 (in FIG. 3, the receivers 10a, 10b, 10c, . . . ) installed at multiple locations. It is assumed that the conventional mobile terminal position detection device 500 is also connected to seven receivers 10a to 10g in the same manner as that of the mobile terminal position detection device 100 of the present embodiment described above with reference to FIG. 1.

As described above with reference to FIG. 2, when there is no need to receive the radio waves from the mobile terminal 20, the receiver 10 is in the dormant state. Also, while the receiver 10 is in the dormant state, the mobile terminal 20 is in the waiting state, and transmits a waiting signal indicative of waiting for the connection from the receiver 10.

In this state, when the mobile terminal position detection device 500 needs to detect the signal strength of the radio waves of the mobile terminal 20, the mobile terminal position detection device 500 requests the seven receivers 10a to 10g to connect to the mobile terminal 20. Then, the receivers 10a to 10g receive the request shift from the dormant state to the search state, and start searching for the waiting signal from the mobile terminal 20.

However, as described above with reference to FIG. 2, since the mobile terminal 20 intermittently transmits the waiting signal and the receiver 10 intermittently searches for the waiting signal, the receivers 10a to 10g do not immediately find the mobile terminal 20 even when the receivers 10a to 10g enter the search state. The mobile terminal 20 cannot be found unless the receiver 10 starts searching for the waiting signal while the mobile terminal 20 is transmitting the waiting signal. In an example shown in FIG. 3, it is assumed that the receiver 10b has found the mobile terminal 20 at the earliest timing.

Then, as described above with reference to FIG. 2, the receiver 10b that has found the mobile terminal 20 transmits a connection request signal to the mobile terminal 20 and shifts to the "connection state". When the mobile terminal 20 receives the connection request signal from the receiver 10b, the mobile terminal 20 shifts to the "connection state" and establishes a connection between the receiver 10b and the mobile terminal 20. When the connection is established in this manner, the mobile terminal 20 and the receiver 10b shift to the "communication state" and become in a state in which the mobile terminal 20 and the receiver 10b can communicate with each other. Therefore, the receiver 10b detects the signal strength of the radio waves of the mobile terminal 20, outputs the signal strength to the mobile terminal position detection device 500, and then terminates the communication state and shifts to the dormant state. In response to the shift of the receiver 10b to the dormant state, the mobile terminal 20 connected to the receiver 10b shifts to the waiting state.

As described above, while the receiver 10b establishes a connection with the mobile terminal 20 and detects the signal strength of the radio waves, the other receivers 10a and 10c to 10g are searching for the waiting signal from the mobile terminal 20 while maintaining the searching state. However, as described above with reference to FIG. 2, since the mobile terminal 20 does not transmit the waiting signal in the connection state and the communication state, the other receivers 10a and 10c to 10g cannot find the mobile terminal 20. Only after the mobile terminal 20 terminates a communication with the receiver 10b and returns to the waiting state, the mobile terminal 20 can be searched for.

In the example shown in FIG. 3, as a result, it is assumed that the receiver 10a has found the mobile terminal 20. Next time, the receiver 10a establishes a connection with the mobile terminal 20, starts a communication, detects the signal strength of the radio waves of the mobile terminal 20, and then outputs the detected signal strength to the mobile terminal position detection device 500. Also, while the communication with the receiver 10a is established, the mobile terminal 20 is not in the waiting state, and therefore the waiting signal is not transmitted. As a result, the other receivers 10c to 10g cannot find the mobile terminal 20, and only after the mobile terminal 20 terminates the communication with the receiver 10a and returns to the waiting state, the mobile terminal 20 can be searched.

As described above, in the conventional mobile terminal position detection device 500, when the signal strength of the radio waves from the mobile terminal 20 is going to be detected by the multiple receivers 10, a time required for the detection inevitably increases. Further, as the number of receivers 10 is increased in an attempt to improve the positional accuracy of detecting the existence position of the mobile terminal 20, the time required for detection becomes longer. While there is a possibility that the mobile terminal 20 moves during this period, the mobile terminal position detection device 500 cannot determine whether or not the mobile terminal 20 is moving. As a result, the detection accuracy of the existing position is limited by the range in which the mobile terminal 20 can move, and it is eventually difficult to detect the existence position of the mobile terminal 20 with sufficient accuracy even if the number of receivers 10 is increased.

On the other hand, the mobile terminal position detection device 100 of the present embodiment can detect the existence position of the mobile terminal 20 with sufficient accuracy by detecting the signal strength of the radio waves of the mobile terminal 20 with the multiple receivers 10.

Figure 4:
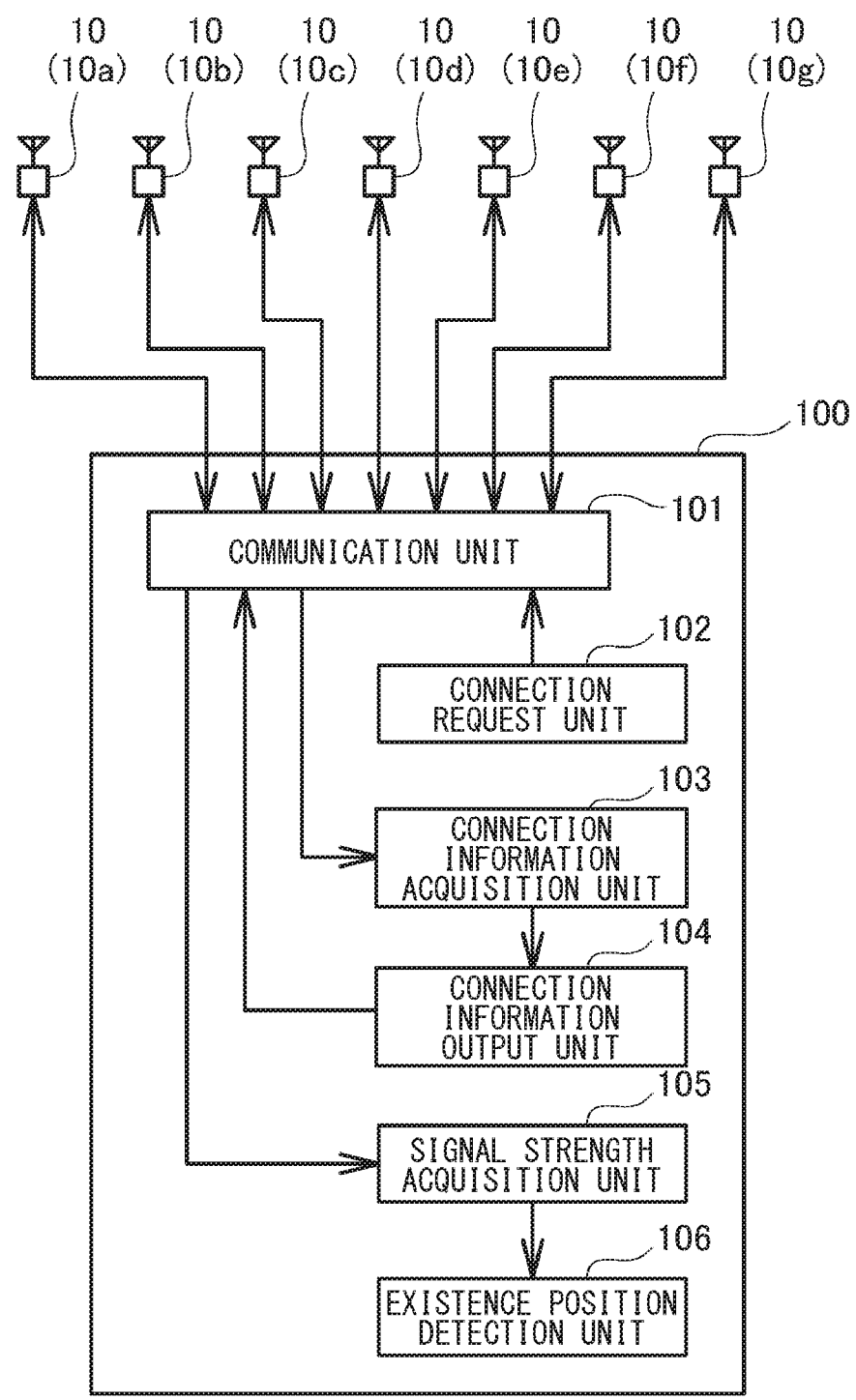
FIG. 4 is a block diagram showing a rough internal structure of the mobile terminal position detection device according to the present embodiment.

FIG. 4 shows a rough internal structure of the mobile terminal position detection device 100 according to the present embodiment. As shown in the figure, the mobile terminal position detection device 100 includes a communication unit 101, a connection request unit 102, a connection information acquisition unit 103, a connection information output unit 104, a signal strength acquisition unit 105, and an existence position detection unit 106.

In the mobile terminal position detection device 100 according to the present embodiment, those "units" represent abstract concepts in which the inside of the mobile terminal position detection device 100 is classified for convenience, focusing on the functions of detecting the existence position of the mobile terminal based on the signal strength of the radio waves. Therefore, the inside of the mobile terminal position detection device 100 is not physically divided into those "unit". Those "units" can be realized as a computer program executed by a CPU, can be realized as an electronic circuit including an LSI, or can be realized as a combination of the computer program with the electronic circuit.

The communication unit 101 is connected to the receivers 10a to 10g by a cable, and can communicate with each other according to a predetermined communication standard.

When there is a need to detect the existence position of the mobile terminal 20, the connection request unit 102 requests the receivers 10a to 10g to connect to the mobile terminal 20. The request output by the connection request unit 102 is transmitted to the receivers 10a to 10g through the communication unit 101. The receivers 10a to 10g start searching for the mobile terminal 20 in order to connect to the mobile terminal 20 according to the request. The receiver 10 that has found the mobile terminal 20 acquires connection information used for connection with the mobile terminal 20, thereby establishing a connection with the mobile terminal 20.

The connection information acquisition unit 103 acquires connection information from the receiver 10 that has established a connection with the mobile terminal 20. When the connection information is acquired, the connection information acquisition unit 103 may detect the receiver 10 whose connection is established and request the connection information, or when the connection request unit 102 needs to connect to the receivers 10a to 10g, the connection request unit 102 also request the receivers 10a to 10g to return the connection information when the connection is established. Furthermore, a function of outputting the acquired connection information to the mobile terminal position detection device 100 may be incorporated in advance in the receivers 10a to 10g. When the connection information acquisition unit 103 acquires the connection information, the connection information acquisition unit 103 outputs the connection information to the connection information output unit 104.

Upon receiving the connection information, the connection information output unit 104 outputs the connection information toward the receiver 10 that has not yet been connected to the mobile terminal 20. In other words, even if the multiple receivers 10a to 10g attempt to simultaneously connect to the mobile terminal 20, those receivers 10a to 10g cannot be connected at the same time, and therefore, at the time when the connection information acquisition unit 103 acquires the connection information, there are receivers 10 that have not yet been connected to the mobile terminal 20. The connection information output unit 104 outputs the connection information to such receivers 10. The receiver 10 that has received the connection information is put into a state of being able to receive the radio waves from the mobile terminal 20, even though the receiver 10 is not connected to the mobile terminal 20.

The signal strength acquisition unit 105 acquires the signal strength of the radio waves of the mobile terminal 20 detected by the receivers 10a to 10g. As described above, since all of the receivers 10a to 10g have already acquired the connection information, when the mobile terminal 20 outputs the radio waves, the receivers 10a to 10g can receive the radio waves and detect the signal strength. The signal strength acquisition unit 105 acquires the signal strengths detected by the receivers 10a to 10g, and outputs those signal strengths to the existence position detection unit 106.

The existence position detection unit 106 detects the existence position of the mobile terminal 20 based on the signal strength acquired from the signal strength acquisition unit 105.

Since the mobile terminal position detection device 100 of the present embodiment has various functions as described above, the detection accuracy of the existence position of the mobile terminal 20 can be improved by increasing the number of receivers 10. Hereinafter, in order to describe the reason, the processing executed by the mobile terminal position detection device 100 of the present embodiment to detect the existence position of the mobile terminal 20 will be described in detail.

Figure 5:
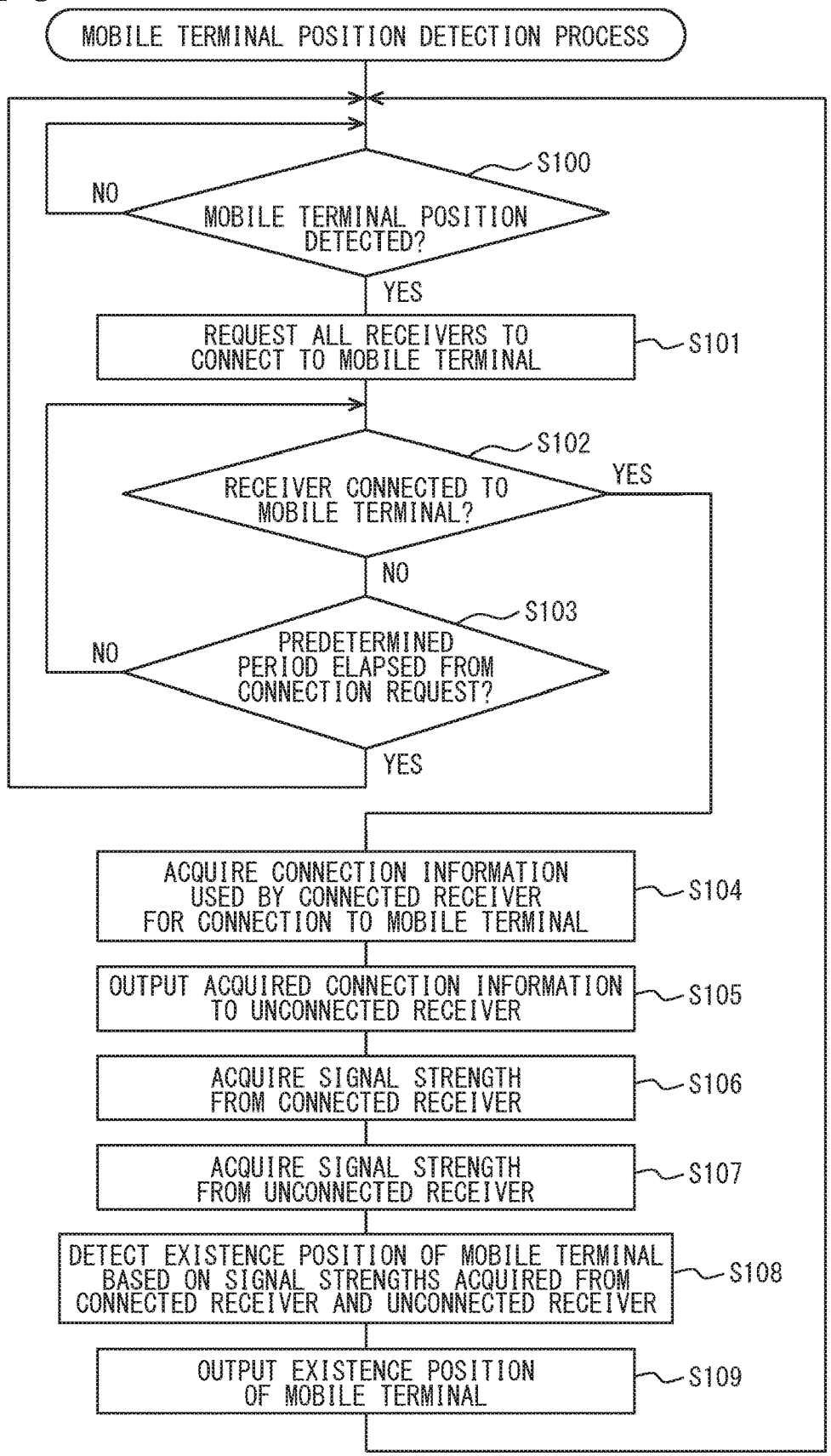
FIG. 5 is a flowchart of a mobile terminal position detection process of detecting an existence position of the mobile terminal by the mobile terminal position detection device according to the present embodiment.

B. Mobile Terminal Position Detection Process:

FIG. 5 is a flowchart of the mobile terminal position detection process executed by the mobile terminal position detection device 100 according to the present embodiment.

As shown in the figure, when the mobile terminal position detection process is started, first, it is determined whether or not the existence position of the mobile terminal 20 is detected (S100). In the present embodiment, the existence position is detected every time a predetermined time (for example, 5 seconds) elapses, but the existence position of the mobile terminal 20 may be detected when a request is received from another program.

As a result, when it is determined that the existence position of the mobile terminal 20 is not detected (no in S100), the mobile terminal 20 is put into the waiting state by repeating the same determination (S100).

On the other hand, when it is determined that the existence position of the mobile terminal 20 is detected (yes in S100), the receivers 10a to 10g connected to the mobile terminal position detection device 100 is requested to be connected to the mobile terminal 20 (S101). As described above with reference to FIG. 3, the receivers 10a to 10g which have received the request shift from the dormant state to the search state, and start searching for the waiting signal transmitted from the mobile terminal 20. However, even if the search is started, the waiting signal cannot be always immediately received. Therefore, among the receivers 10a to 10g, the receiver 10 that first received the waiting signal connects to the mobile terminal 20 by first transmitting the connection request signal.

When the mobile terminal position detection device 100 requests the receivers 10a to 10g to connect to the mobile terminal 20 (S101), the mobile terminal position detection device 100 determines whether or not there is a receiver 10 that has been connected to the mobile terminal 20 (S102). In the determination, whether or not the connection can be performed may be determined by inquiring of the respective receivers 10a to 10g from the mobile terminal position detection device 100, or when the connection is requested to the receivers 10a to 10g, a fact that the connection has been performed may be supplied as a reply, and the connection may be determined based on the presence or absence of the reply.

As a result, when there is no receiver 10 connected to the mobile terminal 20 (no in S102), it is determined whether or not a predetermined period (for example, 2 seconds) has elapsed since the connection is requested (S103). When the predetermined period has not elapsed (no in S103), the process returns to S102 to determine whether or not there is a receiver 10 connected to the mobile terminal 20. In this manner, when a predetermined period of time has elapsed after requesting the receivers 10a to 10g to connect to the mobile terminal 20 (yes in S103) while repeating the determinations in S102 and S103, it is considered that there is no mobile terminal 20 to be connected, so that the process returns to the beginning of the process and the above-described series of processes is resumed.

On the other hand, when there is a receiver 10 (hereinafter, referred to as a connection receiver) which has been connected to the mobile terminal 20 (yes in S102), the connection information is acquired from the connected receiver (S104). In this example, the connection information is information used by the receiver 10 that has established a connection with the mobile terminal 20 (that is, the connected receiver) to communicate with the mobile terminal 20. The content of the connection information differs depending on the communication standard, but includes, for example, identification numbers of each other, a frequency channel used for a wireless communication, a communication interval, a data structure of data to be communicated, and the like. In addition, when a communication is performed by encryption, an encryption key is also included in the connection information.

Upon acquiring the connection information from the connected receiver in this way (S104), the mobile terminal position detection device 100 outputs the connection information to a receiver 10 (hereinafter referred to as an unconnected receiver) that has not yet been connected to the mobile terminal 20 (hereinafter referred to as an unconnected receiver) (S105). In other words, the connection information is information used by the receiver 10 first connected to the mobile terminal 20 among the receivers 10*a* to 10*g* for communication with the mobile terminal 20, and the connection information is output to another receiver 10 that is not yet connected to the mobile terminal 20.

Figure 6:
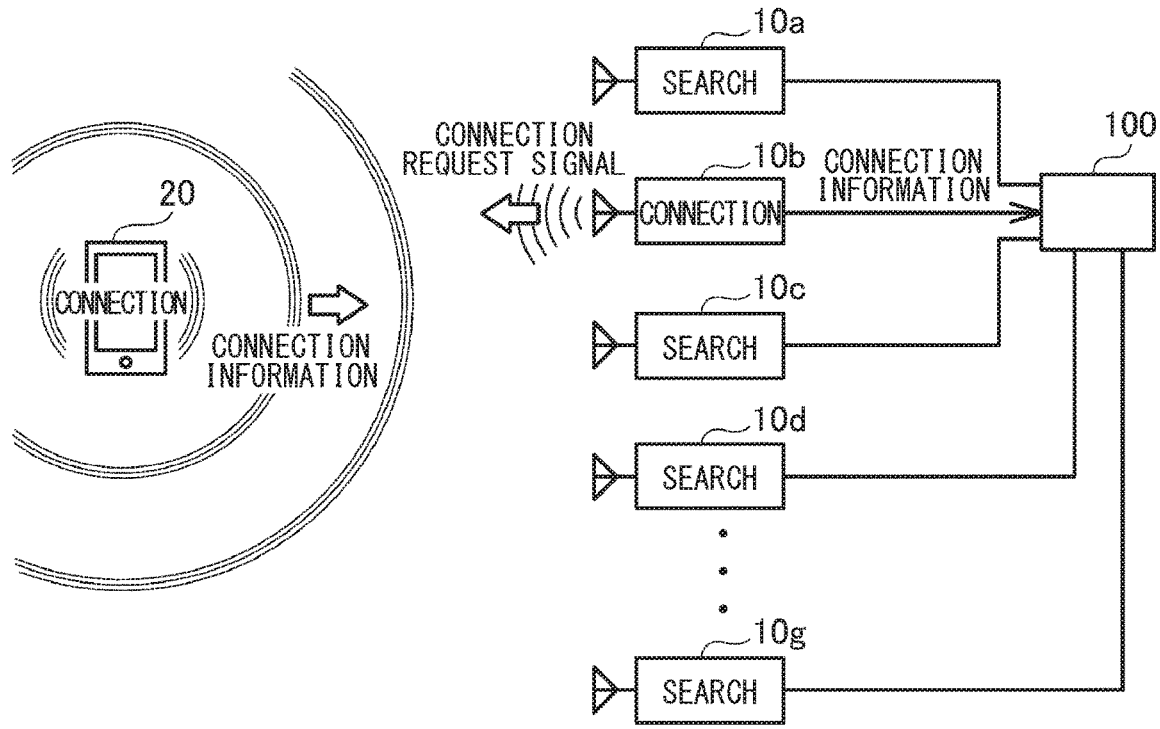
FIG. 6 is an illustrative diagram showing a state in which the mobile terminal position detection device acquires connection information from a connected receiver and outputs the connection information to an unconnected receiver according to the present embodiment.
Figure 6:
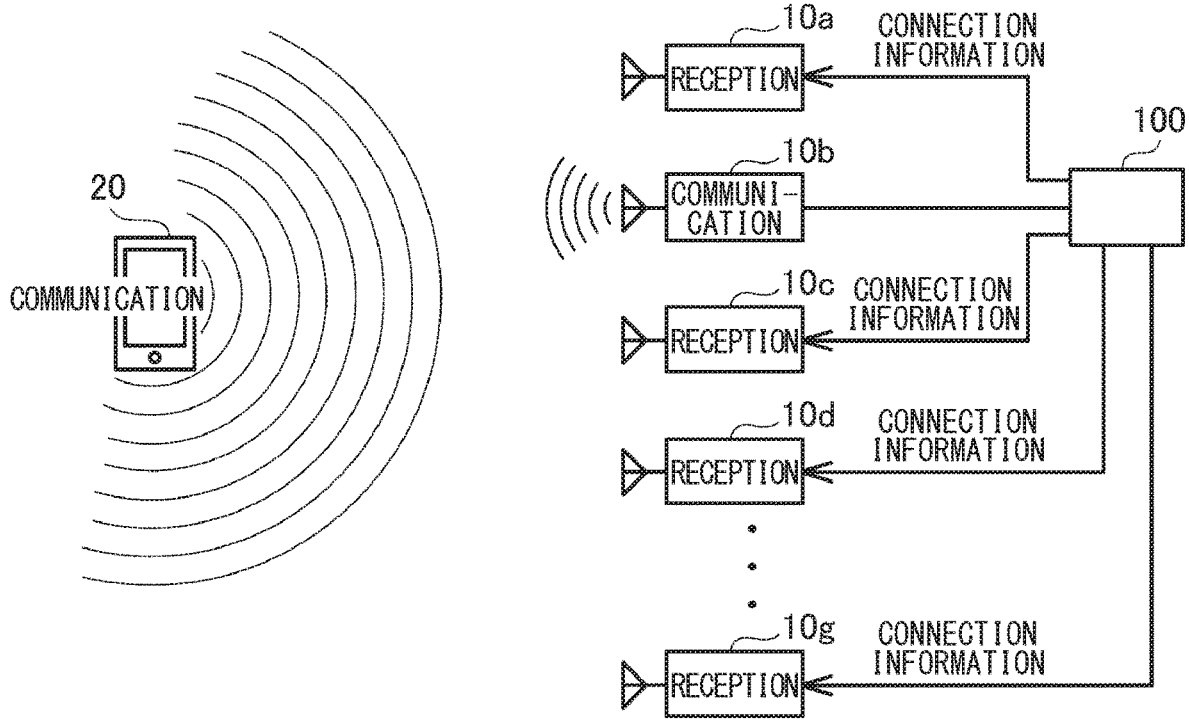

FIG. 6 shows a state in which the mobile terminal position detection device 100 of the present embodiment acquires the connection information from the connected receiver and outputs the acquired connection information to the unconnected receiver. (a) in FIG. 6 shows a state in which the receiver 10*b* first finds the mobile terminal 20 among the receivers 10*a* to 10*g* that have searched for the mobile terminal 20, and transmits a connection request signal to the mobile terminal 20.

The mobile terminal 20 that has received the connection request signal shifts from the waiting state for transmitting the waiting signal to the connection state, and transmits the connection information for establishing the connection. Then, the receiver 10*b* establishes a connection with the mobile terminal 20 by receiving the transmitted connection information. Therefore, in an example shown in FIG. 6, the receiver 10*b* is a connected receiver, and the receiver 10*a* and the receivers 10*c* to 10*g* are unconnected receivers. When the receiver 10*b* has established the connection with the mobile terminal 20, the receiver 10*b* outputs the connection information used for communication with the mobile terminal 20 to the mobile terminal position detection device 100.

Then, the mobile terminal position detection device 100 outputs the acquired connection information to the receivers 10*a* and 10*c* to 10*g* that have not yet been connected to the mobile terminal 20. As a result, the receiver 10*a* and the receivers 10*c* to 10*g* shift from the search state to the reception state in which the radio waves of the mobile terminal 20 can be received. In other words, in order for the receiver 10*a* and the receivers 10*c* to 10*g* in the search state to be able to receive the radio waves of the mobile terminal 20, the conventional method needs to shift from the search state to the communication state through the connection state, but in the present embodiment, the receiver 10 a and the receivers 10*c* to 10*g* shift to the reception state without passing through the connection state. Further, since the receiver 10*b* is shifted to the communication state through the connection state, the radio waves from the mobile terminal 20 can be received.

Since the receiver 10 in the reception state has not established the connection with the mobile terminal 20, it is desirable to assume that the transmission to the mobile terminal 20 cannot be performed. With the above configuration, while the receiver 10 that has established the connection transmits to the mobile terminal 20, the receiver 10 that has not established the connection can be prevented from transmitting the radio waves to the mobile terminal 20 and causing so-called communication collision.

In this way, the connection information is output to the unconnected receivers (in an example shown in FIG. 6, the receiver 10*a* and the receivers 10*c* to 10*g*) (S105 in FIG. 5), when the radio waves of the mobile terminal 20 can be received by the receivers 10*a* to 10*g*, the signal strength of the radio waves detected by the connected receiver (in the example shown in FIG. 6, the receiver 10*b*) is acquired (S106). Subsequently, the signal strength of the radio waves detected by the unconnected receivers (in the examples shown in FIG. 6, the receiver 10*a* and the receivers 10*c* to 10*g*) is acquired (S107).

Then, the existence position of the mobile terminal 20 is detected based on the signal strengths acquired by the respective receivers 10*a* to 10*g* (S108). A method conventionally used can be applied to the method of detecting the existence position of the mobile terminal 20 based on the signal strength.

Thereafter, after the obtained existence position of the mobile terminal 20 has been output to the outside (for example, other programs or other vehicle-mounted devices mounted on the vehicle 1) (S109), the process returns to S100 which is the beginning of the processing, and the series of processing described above is resumed.

Since the mobile terminal position detection device 100 of the present embodiment detects the existence position of the mobile terminal 20 as described above, the existence position of the mobile terminal 20 can be detected with sufficient accuracy even though the signal strength of the radio waves of the mobile terminal 20 is used by the multiple receivers 10.

Figure 7:
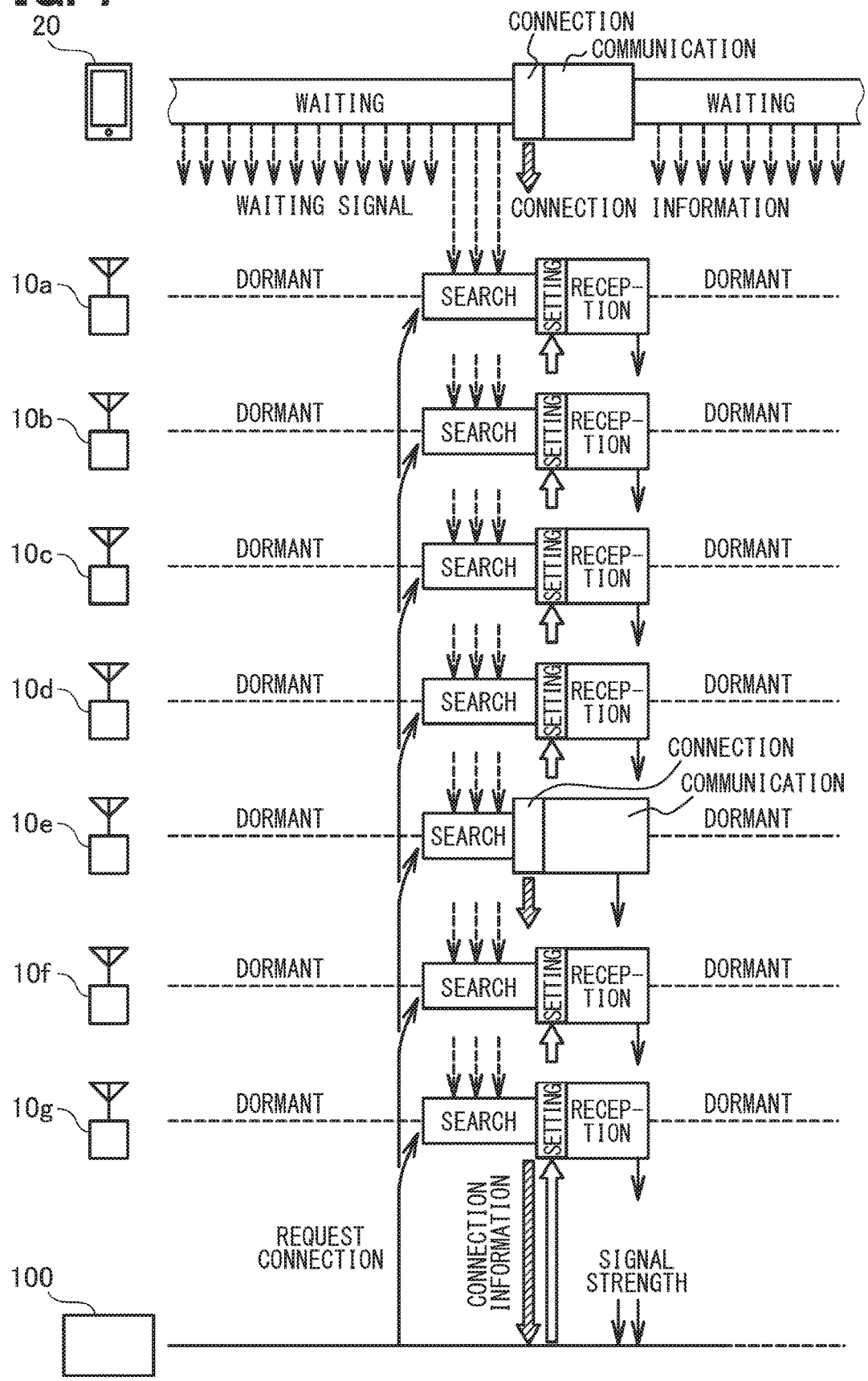
FIG. 7 is an illustrative view showing a reason why the mobile terminal position detection device does not require a long time to detect a signal strength of radio waves from the mobile terminal even if the number of receivers increases according to the present embodiment.

FIG. 7 shows the reason why the mobile terminal position detection device 100 of the present embodiment can detect the existence position of the mobile terminal 20 with sufficient accuracy.

As shown in the figure, when the mobile terminal position detection device 100 requests the receivers 10*a* to 10*g* to connect to the mobile terminal 20 in an attempt to detect the existence position of the mobile terminal 20, the receivers 10*a* to 10*g* which have been in the dormant state until then start searching for the waiting signal transmitted by the mobile terminal 20. In FIG. 7, the waiting signal transmitted by the mobile terminal 20 is represented by a broken line arrow.

Then, the receiver 10 that has received the waiting signal first among the receivers 10*a* to 10*g* shifts from the search state to the connection state, acquires connection information from the mobile terminal 20, and further outputs the connection information to the mobile terminal position detection device 100. FIG. 7 shows a case where the receiver 10*e* receives the waiting signal first, and illustrates a state where the mobile terminal 20 transmits the connection information to the receiver 10*e* and a state where the receiver 10*e* outputs the connection information received from the mobile terminal 20 to the mobile terminal position detection device 100 by hatched arrows.

Upon receiving the connection information from the receiver 10*e*, the mobile terminal position detection device 100 outputs the connection information to the receivers 10*a* to 10*d*, 10*f*, and 10*g*. As a result, the receivers 10*a* to 10*d*, 10*f*, and 10*g* are in a reception state capable of receiving the radio waves from the mobile terminal 20. Since the receiver 10*e* receiving the connection information from the mobile terminal 20 is in the communication state, the receiver 10*e* can also receive radio waves from the mobile terminal 20.

Then, the signal strength of the radio waves is detected in a state in which all the receivers 10*a* to 10*g* can receive the radio waves from the mobile terminal 20. As a result, the signal strength when the same radio waves output from the mobile terminal 20 are received by the receivers 10*a* to 10*g* can be detected. This process does not change even if the number of receivers 10 increases.

For that reason, in the mobile terminal position detection device 100 of the present embodiment, since the positional accuracy can be increased by increasing the number of receivers 10, the existence position of the mobile terminal 20 can be detected with sufficient accuracy.

C. Modification

The mobile terminal position detection device 100 of the present embodiment has been described as being connected to the receivers 10a to 10g through the communication unit 101. In that case, the communication performed between the communication unit 101 and the receivers 10a to 10g is also performed in accordance with the communication rule of the master-client system. Further, when the existence position of the mobile terminal 20 is detected, connection is requested to the receivers 10a to 10g through the communication unit 101 at the same time.

On the other hand, the receiver 10a capable of communicating with the mobile terminal position detection device 100 without passing through the communication device 101 may be provided, and the other receivers 10 (that is, the receivers 10b to 10g) may communicate with the mobile terminal position detection device 100 through the communication unit 101. When the existence position of the mobile terminal 20 is detected, connection may be requested to the receiver 10a without requesting connection to the receivers 10b to 10g.

Figure 8:
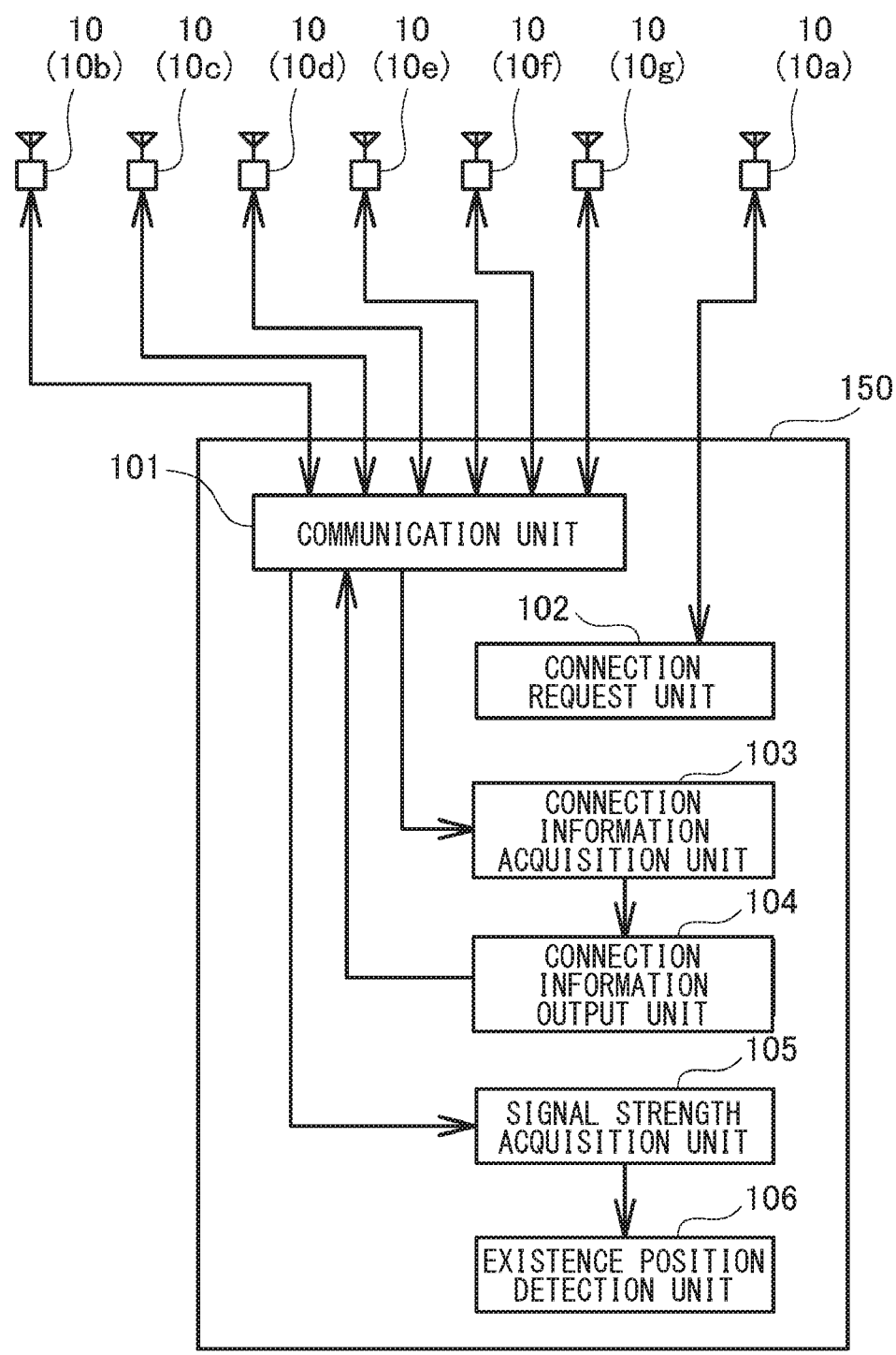
FIG. 8 is a block diagram showing a rough internal structure of a mobile terminal position detection device according to a modification.

FIG. 8 shows a rough internal structure of a mobile terminal position detection device 150 in the modification. The mobile terminal position detection device 150 according to the modification differs from the mobile terminal position detection device 100 of the present example described above with reference to FIG. 4 in that the receiver 10a is directly connected to the connection request unit 102, but the other configurations are the same.

In the mobile terminal position detection device 150 according to the modification, the receiver 10a and the connection request unit 102 are directly connected to each other. For that reason, the communication can be performed at high speed without being restricted by the communication rule of the master-client system such as when the receivers 10b to 10g communicate with the communication unit 101.

Figure 9:
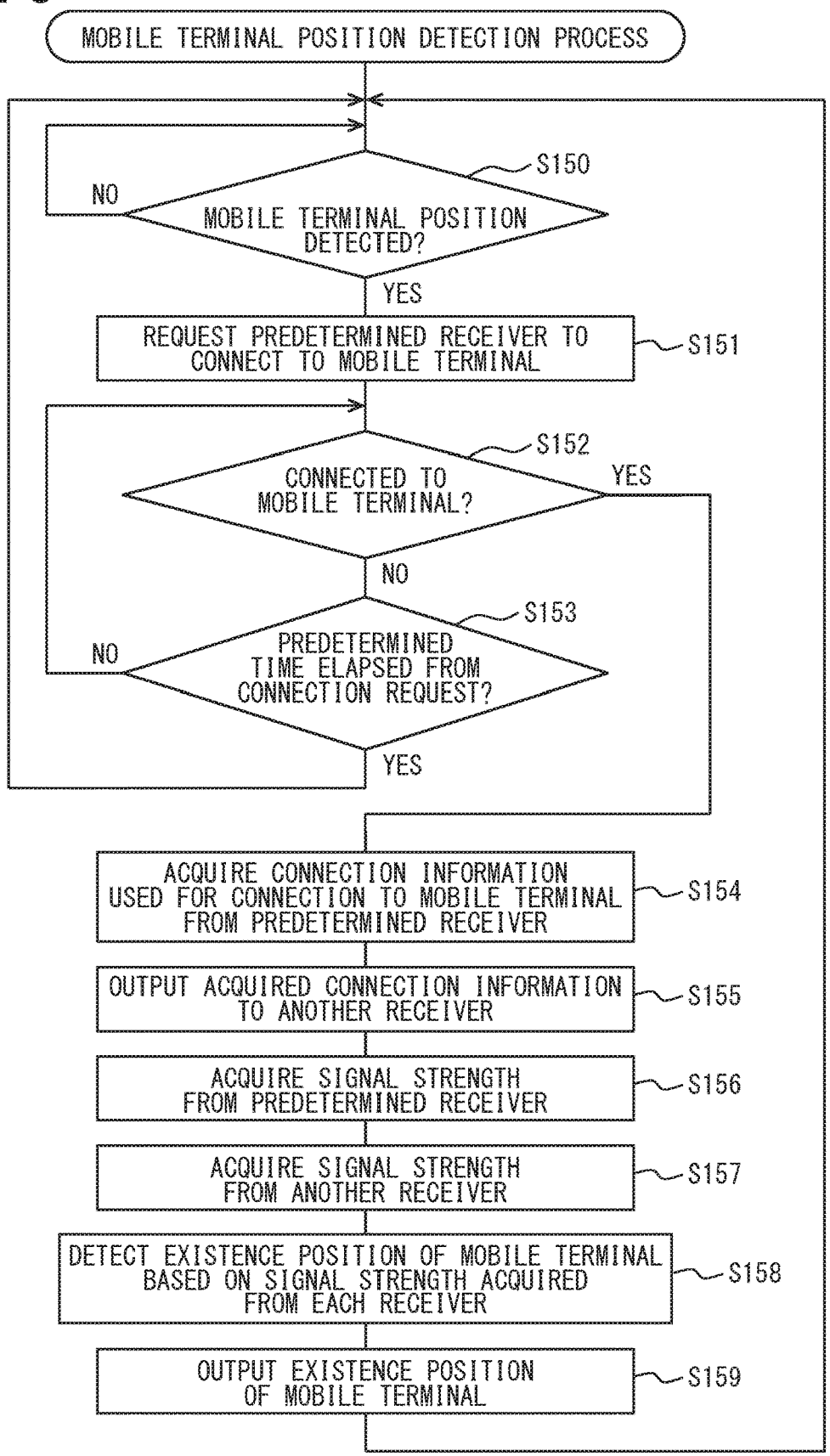
FIG. 9 is a flowchart of a mobile terminal position detection process of detecting an existence position of the mobile terminal by the mobile terminal position detection device according to the modification.

FIG. 9 shows a flowchart of the mobile terminal position detection process executed by the mobile terminal position detection device 150 according to the modification. This processing is greatly different from the mobile terminal position detection processing described above with reference to FIG. 5 in that a connection to the mobile terminal 20 is requested to a predetermined receiver 10 (in this example, the receiver 10a), but is not requested to the other receivers 10 (in this example, the receivers 10b to 10g). Hereinafter, the mobile terminal position detection processing of the modification will be briefly described focusing on the above difference.

As shown in FIG. 9, even in the mobile terminal position detection process of the modification, it is first determined whether or not to detect the existence position of the mobile terminal 20, as in the case of the embodiment described above (S150). When it is determined that the existence position of the mobile terminal 20 is not detected (no in S150), the same determination (S100) is repeated to enter the waiting state.

On the other hand, when it is determined that the existence position of the mobile terminal 20 is detected (yes in S150), the receiver 10a is requested to connect to the mobile terminal 20 (S151). As described above with reference to FIG. 8, unlike the receivers 10b to 10g, since the receiver 10a is connected to the mobile terminal position detection device 150 in a so-called peer-to-peer manner, a communication can be performed at a higher speed than that of the receivers 10b to 10g.

Subsequently, it is determined whether or not the predetermined receiver 10a has been connected to the mobile terminal 20 (S152), and if not connected (no in S152), it is determined whether or not a predetermined time has elapsed after requesting the connection (S153). As a result, when the predetermined period has not elapsed (no in S153), it is determined whether or not the receiver 10a has been connected to the mobile terminal 20 (S152). If the predetermined period of time has elapsed (yes in S153) while repeating such a determination, it is considered that there is no mobile terminal 20 to be connected, so that the process returns to the beginning of the process and the series of processes described above is resumed.

On the other hand, when the predetermined receiver 10 (in this example, the receiver 10a) can be connected to the mobile terminal 20 (yes in S152), the connection information is acquired from the receiver 10a (S154), and then the connection information is output toward the other receivers 10 (in this example, the receivers 10b to 10g) (S155). As a result, those receivers 10b to 10g are also in a reception state capable of receiving the radio waves of the mobile terminal 20.

In this manner, when the receivers 10a to 10g can receive the radio waves of the mobile terminal 20, the signal strength of the radio waves detected by the receiver 10a is acquired (S156), and then the signal strength of the radio waves detected by the other receivers 10b to 10g is acquired (S157). Then, after the existence position of the mobile terminal 20 has been detected based on the signal strengths acquired by the respective receivers 10a to 10g (S158), the existence position of the mobile terminal 20 is output to the outside (S159), and the process returns to S150 which is the beginning of the process.

In the mobile terminal position detection device 150 according to the modification, since the connection information is acquired with the use of the receiver 10a capable of performing high-speed communication among the receivers 10a to 10g, the existence position of the mobile terminal 20 can be detected more quickly.

Here, the process of the flowchart or the flowchart described in this application includes a plurality of sections (or steps), and each section is expressed as, for example, S100. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A mobile terminal position detection device configured to detect a position of a mobile terminal by acquiring a signal strength of a radio wave from the mobile terminal as received by each of a plurality of receivers mounted on a vehicle and connected to the mobile terminal position detection device, the mobile terminal and the plurality of receivers configured to wirelessly communicate with each other, wherein the mobile terminal is operable in
a connection waiting state, whereby the mobile terminal transmits a waiting signal at a predetermined cycle, the waiting signal indicating that the mobile terminal is waiting for a connection request signal from each receiver;

a connection information exchanging state, whereby the mobile terminal exchanges connection information with one of the receivers to establish a communication with the one of the receivers in response to the mobile terminal receiving the connection request signal from the one of the receivers, the receiving of the connection request signal instructing the mobile terminal to switch from the connection waiting state to the connection information exchanging state; and a mobile terminal communication state, whereby the mobile terminal communicates with the one of the receivers using the connection information in response to the mobile terminal completing the exchanging of the connection information with the one of the receivers, the completing of the exchanging of the connection information instructing the mobile terminal to switch from the connection information exchanging state to the mobile terminal communication state, and wherein each receiver is operable in a dormant state, whereby the receiver stops receiving the waiting signal from the mobile terminal;

a search state, whereby the receiver waits to receive the waiting signal from the mobile terminal in response to receiving a request for connecting to the mobile terminal, the receiving of the request for connecting to the mobile terminal instructing the receiver to switch from the dormant state to the search state, and whereby the receiver further repeats an operation until receiving the waiting signal, wherein the operation temporarily interrupts the receiver waiting to receive the waiting signal in response to the receiver not receiving the waiting signal within a predetermined amount of time;

a connection establishing state, whereby the receiver transmits the connection request signal to the mobile terminal in response to receiving the waiting signal, the receiving of the waiting signal instructing the receiver to switch from the search state to the connection establishing state, and whereby the receiver further exchanges the connection information with the mobile terminal to communicate with the mobile terminal that transmits the waiting signal after the receiver transmits the connection request signal; and a receiver communication state, whereby the receiver communicates with the mobile terminal using the connection information in response to the receiver completing the exchanging of the connection information with the mobile terminal, the completing of the exchanging of the connection information with the mobile terminal instructing the receiver to switch from the connection establishing state to the receiver communication state, the mobile terminal position detection device comprising:

a processor connected to the plurality of receivers, the processor configured to request the plurality of receivers to connect to the mobile terminal, the plurality of receivers switching from the dormant state to the search state upon receiving the request to connect to the mobile terminal;

acquire the connection information from a connected receiver, the connected receiver being one of the plurality of receivers that connects to the mobile terminal in response to receiving the waiting signal from the mobile terminal;

output the connection information acquired from the connected receiver to a remainder of the plurality of receivers not connected to the mobile terminal, the remainder of the plurality of receivers not connected to the mobile terminal switching from the search state to a reception state in response to receiving the connection information, the reception state indicating that the remainder of the plurality of receivers not connected to the mobile terminal is/are ready for receiving the radio wave from the mobile terminal;

acquire the signal strength of the radio wave from the mobile terminal from each of the plurality of receivers; and detect the position of the mobile terminal based on the signal strength of the radio wave acquired from each of the plurality of receivers.

2. The mobile terminal position detection device according to claim 1, wherein:

the processor is further configured to request a predetermined receiver among the plurality of receivers to connect to the mobile terminal; and acquire the connection information from the predetermined receiver.

3. The mobile terminal position detection device according to claim 1, wherein:

the remainder of the plurality of receivers not connected to the mobile terminal and operating in the search state repeats/repeat the operation at a predetermined interval that is different from the predetermined cycle at which the mobile terminal transmits the waiting signal.

4. A mobile terminal position detection method for detecting a position of a mobile terminal by acquiring a signal strength of a radio wave from the mobile terminal as received by each of a plurality of receivers mounted on a vehicle, the mobile terminal and the plurality of receivers configured to wirelessly communicate with each other, wherein the mobile terminal is operable in a connection waiting state, whereby the mobile terminal transmits a waiting signal at a predetermined cycle, the waiting signal indicating that the mobile terminal is waiting for a connection request signal from each receiver;

a connection information exchanging state, whereby the mobile terminal exchanges connection information with one of the receivers to establish a communication with the one of the receivers in response to the mobile terminal receiving the connection request signal from the one of the receivers, the receiving of the connection request signal instructing the mobile terminal to switch from the connection waiting state to the connection information exchanging state; and a mobile terminal communication state, whereby the mobile terminal communicates with the one of the receivers using the connection information in response to the mobile terminal completing the exchanging of the connection information with the one of the receivers, the completing of the exchanging of the connection information instructing the mobile terminal to switch from the connection information exchanging state to the mobile terminal communication state, and wherein each receiver is operable in
- a dormant state, whereby the receiver stops receiving the waiting signal from the mobile terminal;
- a search state, whereby the receiver waits to receive the waiting signal from the mobile terminal in response to receiving a request for connecting to the mobile terminal, the receiving of the request for connecting to the mobile terminal instructing the receiver to switch from the dormant state to the search state, and whereby the receiver further repeats an operation until receiving the waiting signal, wherein the operation temporarily interrupts the receiver waiting to receive the waiting signal in response to the receiver not receiving the waiting signal within a predetermined amount of time ;
- a connection establishing state, whereby the receiver transmits the connection request signal to the mobile terminal in response to receiving the waiting signal, the receiving of the waiting signal instructing the receiver to switch from the search state to the connection establishing state, and whereby the receiver further exchanges the connection information with the mobile terminal to communicate with the mobile terminal that transmits the waiting signal after the receiver transmits the connection request signal; and
- a receiver communication state, whereby the receiver communicates with the mobile terminal using the connection information in response to the receiver completing the exchanging of the connection information with the mobile terminal, the completing of the exchanging of the connection information with the mobile terminal instructing the receiver to switch from the connection establishing state to the receiver communication state, the method comprising:
- requesting the plurality of receivers to connect to the mobile terminal, the plurality of receivers switching from the dormant state to the search state upon receiving the request to connect to the mobile terminal;
- acquiring the connection information from a connected receiver, the connected receiver being one of the plurality of receivers that connects to the mobile terminal in response to receiving the waiting signal from the mobile terminal;
- outputting the connection information acquired from the connected receiver to to a remainder of the plurality of receivers not connected to the mobile terminal, the remainder of the plurality of receivers not connected to the mobile terminal switching from the search state to a reception state in response to receiving the connection information, the reception state indicating that the remainder of the plurality of receivers not connected to the mobile terminal is/are ready for receiving the radio wave from the mobile terminal;
- acquiring the signal strength of the radio wave from the mobile terminal from each of the plurality of receivers; and
- detecting the position of the mobile terminal based on the signal strength of the radio wave acquired from each of the plurality of receivers.

* * * * *